United States Patent
Nilsson et al.

(10) Patent No.: US 12,162,665 B2
(45) Date of Patent: Dec. 10, 2024

(54) PACKAGING FOR LIQUID PRODUCTS AND A PROCEDURE FOR FILLING THE PACKAGING AND A PROCESS FOR PRODUCING AN INNER BAG FOR THE PACKAGING

(71) Applicant: RIN-PACK AB, Finspång (SE)

(72) Inventors: Leif Nilsson, Finspång (SE); Billy Nilson, Mjölby (SE)

(73) Assignee: RIN-PACK AB, Finspång (SE)

( * ) Notice: Subject to any disclaimer, the term of this patent is extended or adjusted under 35 U.S.C. 154(b) by 219 days.

(21) Appl. No.: 17/786,274

(22) PCT Filed: Dec. 16, 2020

(86) PCT No.: PCT/SE2020/051224
§ 371 (c)(1),
(2) Date: Jun. 16, 2022

(87) PCT Pub. No.: WO2021/126064
PCT Pub. Date: Jun. 24, 2021

(65) Prior Publication Data
US 2023/0025325 A1  Jan. 26, 2023

(30) Foreign Application Priority Data

Dec. 20, 2019 (SE) .................................... 1930412-0
Sep. 5, 2020 (SE) .................................... 2030278-2

(51) Int. Cl.
*B65D 77/06* (2006.01)
*B65B 3/02* (2006.01)
(Continued)

(52) U.S. Cl.
CPC .............. *B65D 77/067* (2013.01); *B65B 3/02* (2013.01); *B65B 3/06* (2013.01); *B65B 7/2821* (2013.01);
(Continued)

(58) Field of Classification Search
CPC .... B65D 77/06; B65D 77/062; B65D 77/065; B65D 77/067; B65D 77/068; B65D 5/60;
(Continued)

(56) References Cited

U.S. PATENT DOCUMENTS 3,112,047 A * 11/1963 Weinreich ............ B65D 5/5059
222/105
4,257,535 A * 3/1981 Mellett .................. B29C 66/61
222/83
(Continued)

FOREIGN PATENT DOCUMENTS

DE         3727789 A1    3/1988
DE    202014002754 U1    7/2015
(Continued)

OTHER PUBLICATIONS

International Search Report from corresponding International Application No. PCT/SE2020/051224, mailed on Feb. 19, 2021, 4 pages.

*Primary Examiner* — Nicolas A Arnett
(74) *Attorney, Agent, or Firm* — Tucker Ellis LLP

(57) ABSTRACT

Packaging for liquid food, where the packaging has an outer casing (2) of cardboard, an inner bag (8) of plastic foil which consists of e.g. completely recyclable bio-polyethylene plastic, where the inner bag is arranged inside the outer casing (2) and completely fills it when the inner bag is filled with the food, and an opening module, here called MF module (12), which contains an emptying device and a filling device arranged on a plastic disc (14), wherein the emptying device comprises an emptying channel (13) and a stopper (19) and where the filling device comprises a filling channel (25) and a filling plug (26) and wherein the MF module (12) is connected to the inner bag (8) by that the underside of the plastic disc (14) is welded to the outside of the inner bag so that the emptying channel (13) connected to a hole (11) in the inner bag (8) where the filling channel (25) opens into
(Continued)

the emptying channel (13) is connected to the outer cover (2) in that top flaps (6a-6d) of the outer casing are attached to a slot (17) in the plastic disc (14) along the side edges thereof. The application also includes a method for filling the packaging and a method for producing an inner bag for the packaging.

13 Claims, 7 Drawing Sheets

(51) Int. Cl.
- B65B 3/06 (2006.01)
- B65B 7/28 (2006.01)
- B65B 55/02 (2006.01)
- B65D 5/60 (2006.01)
- B65D 5/74 (2006.01)

(52) U.S. Cl.
CPC ............... B65B 55/02 (2013.01); B65D 5/60 (2013.01); B65D 5/746 (2013.01); *Y02W 30/80* (2015.05); *Y02W 90/10* (2015.05)

(58) Field of Classification Search
CPC .. B65D 5/746; B65B 3/02; B65B 3/06; B65B 7/2821; B65B 55/02; Y02W 30/80; Y02W 90/10
See application file for complete search history.

(56) References Cited

U.S. PATENT DOCUMENTS

| | | | |
|---|---|---|---|
| 4,362,255 A * | 12/1982 | Bond | B65D 75/5877 220/795 |
| 4,440,319 A * | 4/1984 | Nitchman | B67D 1/0829 220/23.88 |
| 4,491,247 A * | 1/1985 | Nitchman | B67D 1/04 220/586 |
| 5,156,295 A * | 10/1992 | Gordon | B65D 77/065 222/105 |
| 5,636,785 A * | 6/1997 | Kalberer | B65D 5/067 229/137 |
| 6,560,950 B1 * | 5/2003 | Johansson | B65B 7/20 53/484 |
| 6,971,550 B2 * | 12/2005 | Kuge | B65D 47/247 222/105 |
| 7,770,360 B2 * | 8/2010 | Smith | B65D 75/5866 53/410 |
| 9,862,588 B2 * | 1/2018 | Johnson | B67D 1/0835 |
| 10,167,126 B2 * | 1/2019 | Tacheny | B67D 1/0895 |
| 10,647,563 B2 * | 5/2020 | Showalter | B67D 1/00 |
| 11,292,706 B2 * | 4/2022 | Showalter | B67D 1/0066 |
| 2010/0116824 A1 * | 5/2010 | Stalions | B65D 77/067 220/495.06 |
| 2010/0150478 A1 * | 6/2010 | Murray | B65D 51/185 53/469 |
| 2017/0197744 A1 * | 7/2017 | Larroche | B65B 31/028 |
| 2019/0367219 A1 * | 12/2019 | Bernal-Lara | B65D 75/5877 |

FOREIGN PATENT DOCUMENTS

| | | |
|---|---|---|
| EP | 0007685 A1 | 2/1980 |
| EP | 0807581 A1 | 11/1997 |
| EP | 1510468 A1 | 3/2005 |
| EP | 1786719 B1 | 1/2012 |
| EP | 2847090 B1 | 12/2017 |
| WO | 9709238 A1 | 3/1997 |

* cited by examiner

PACKAGING FOR LIQUID PRODUCTS AND A PROCEDURE FOR FILLING THE PACKAGING AND A PROCESS FOR PRODUCING AN INNER BAG FOR THE PACKAGING

TECHNICAL FIELD

The present invention relates to a packaging in particular intended for foodstuffs in the form of easily flowing liquids as well as viscous liquids. Furthermore, the invention comprises a method for filling liquid into the packaging and a method of producing an inner bag which is arranged in the packaging for receiving the liquid being filled into the packaging.

STATE OF THE ART

Packagings currently used for enclosing liquid foods on the market today cannot be material recycled to a sufficient degree. For that reason, a lot of recycled material goes from this type of food packagings to energy recovery instead of being reused. One reason why existing packaging on the market cannot currently be recycled satisfactorily is that the cardboard used in the packaging is coated with some form of plastic foil.

Packagings which are common on the market today can be represented by, for example, what is described in the document U.S. Pat. No. 6,560,950 (B1). Some shortcomings regarding the prior art packagings are that they are relatively difficult to open for people who have weakened muscles in fingers and hands. A Cap that is to be unscrewed to open a packaging of known type is separate from the packaging after opening and may be lost or fall away. After resealing, air has been admitted into the packaging, which affects the shelf life of the food content. Even in an unopened packaging air is present to an unsatisfactory degree. Up to 7% of the contents of a closed packaging may consist of air which oxidises the contents. Furthermore, it is unsatisfactory that it is difficult to empty the packaging completely of its contents as the packaging cannot be flattened together well enough.

Packagings which according to the prior art are created from cardboard which is coated with a plastic foil is a technique which is not desirable from an industrial point of view. Paper mills prefer to process start material from pure cardboard because laminate can create process problems.

As other examples of prior art, the patents U.S. Pat. Nos. 3,112,047, 4,362,255, 5,156,295, DE 202014002754, US20190367219, EP 0007685, EP 0807581 and WO 9709238 are mentioned here.

DESCRIPTION OF THE INVENTION

The device according to one aspect of the invention is a packaging which is primarily intended for the content of easily flowing liquid as well as viscous foods such as milk, yoghurt, juices and the like. The packaging is also suitable for transports in an efficient way. The invention further includes a method of filling contents into the packaging.

The packaging consists of three parts, an outer casing of cardboard, an inner bag made of a plastic foil, and a multifunctional opening module.

As mentioned, the outer casing is made of cardboard which is up to 100% recyclable. By 100% recyclability is meant that the approximately 90% paper fiber that constitutes the load-bearing material in the cardboard can be completely recycled. The remaining 10% of cardboard consists of moisture and fillers as well as adhesive residues that are not interesting from a recycling point of view. The cardboard material is preferably made of recycled paper fibers. The outside of the cardboard in the packaging is preferably made white or off-white to provide the best basis for clear printing on the outside of a packaging. The inside of the cardboard in the packaging is colored to provide the best possible UV barrier against UV radiation from the packaging environment. The inside is naturally slightly browned when unbleached and/or recycled fibers are used. This provides a certain increased barrier effect against UV radiation from the packaging environment.

According to a preferred embodiment, the outer casing has 4 flaps which are folded towards each other when closing the outer casing so that preferably a completely flat upper part of the outer casing can be created when these flaps are folded towards each other. This is described in more detail below. The lower plane which forms the bottom of the outer casing is made with bottom flaps which are foldable inwards so that the bottom flaps in the bottom of the outer casing can be folded in from the bottom and upwards towards the interior of the outer casing and thereby allow the outer casing to be folded completely flat. The outer casing is here designed in the form of an elongated parallelepiped figure, where the surfaces delimiting the parallelepiped in longitudinal direction are referred to by the designations upper plane and bottom with reference to the position which the packaging and thus the outer casing occupy when storing and transporting an enclosed liquid on the market. The longitudinal surfaces are here referred to as side surfaces, which according to a preferred aspect of the invention are rectangularly shaped.

The inner bag is made of a plastic foil which can be made of completely recyclable biopolyethylene plastic (bio-PE). This inner bag is designed to completely fill the outer casing when the inner bag is filled with a liquid to thereby prevent unnecessary empty spaces from arising between the outer casing and the inner bag.

The multifunctional opening module, also called the MF module, consists of completely recyclable plastic, preferably the same material as in the inner bag. The MF module consists of a plastic disc with an emptying device and a filling device integrated with each other and with the plastic disc on one side, here called the upper side, of the plastic disc. The plastic disc has a flat underside and is welded to the outside of the inner bag at an upper part of the inner bag. Along the edge of the plastic disc runs, around this, a slot, in which the flaps of the outer casing engage when the inner bag is installed inside the outer casing. The emptying device and the filling device are made in one and the same common channel through the plastic disc.

The filling device is used when filling a liquid to the packaging and is completely closed after filling. The emptying device is used when emptying liquid out of the packaging.

The emptying device has an emptying channel in the form of a tubular sleeve which is attached to an opening in the plastic disc and extends upwards from the top of the plastic disc. The opening extends through the plastic disc from its upper side to its lower side. The underside of the plastic disc is secured by welding to the inner bag, said opening being centered over a hole which is arranged in the inner bag, which is described below.

The emptying device further comprises a stopper which in this case is made with an internal thread in a tubular lower part of the stopper. The stopper in turn has a hood at the top, where the hood has a larger area than the cross-sectional area of the tubular lower part of the stopper and forms a sealing roof over the tubular part of the stopper. The internal thread of the stopper is intended to connect to and cooperate with an external corresponding thread of the tubular sleeve of the emptying channel, whereby the stopper can close the opening when it is sealingly screwed to the emptying channel. Between the stopper and the emptying channel there is in a known manner a breakeable connection, here called a breaking contact of, for example plastic, these components in case of unopened stopper being connected to each other until the breaking contact is torn when the stopper is turned up for the first time, whereby a breaking function is formed in the stopper. Exterior and internal thread, respectively, can of course be made in reverse order of the emptying channel and stopper.

Of course, instead a bayonet closure can be used in the emptying channel, where also in this embodiment a locking edge can be used for locking the stopper to the emptying channel in case of unopened packaging. The emptying channel may be provided with a non-return valve to prevent air from entering when the packaging is partially emptied. Such a non-return valve can be used to advantage with thin liquid contents. The stopper has a hood whose cross section can be square with four rounded corners or have a different polygon-like shape so that it will be easy for a user to get a grip about the stopper when opening it.

In an earlier, at the time of filing the present patent application, an invention similar to the present invention has been described in an as yet unpublished patent application. In said earlier application, emptying device with emptying channel and filling device with filling channel are arranged next to each other, whereby two openings to the inner bag are required. Furthermore, in this previous application, a sealing tab is arranged at the filling channel in order to be able to seal against the hole of the filling channel in the plastic disc on the underside of the MF module after filling a content into the inner bag. It is a highly preferred embodiment of the present invention to escape the need for two channels, a channel for filling and a channel for emptying contents to and from the inner bag.

The inner bag is made of two plastic foils which are welded together around the entire edge of each of the plastic foils so that a soft container is formed. The welding is performed when an upper plastic foil is placed over a lower plastic foil, whereupon the welding is performed. Before the welding is performed and before the two plastic foils are laid on top of each other, a hole is punched out in the upper plastic foil in the area which is to take place as the upper layer of the inner bag, where the upper layer refers to the plastic foil laid over the lower layer of plastic foil in connection with the welding of the two plastic foils. This hole is later coordinated to the position of the discharge channel of the MF module when welding the MF module to the upper plastic foil. In an alternative embodiment, the upper plastic foil constitutes one half of a plastic sheet, while the lower plastic foil consists of the other half of the plastic sheet.

The MF module is welded to the upper plastic foil which will later form one half of the inner bag. The weld is designed so that no product from the inner bag, when it is filled, can leak out from the sides of the MF module. The manufacturing of inner bag and welded MF module takes place under conditions approved for food packagings. The inside of the inner bag and the MF module are sterilized by gamma radiation after joining. Gamma radiation irradiation can be performed for each inner bag, for a container with inner bags or when a pallet is completely full of inner bags.

It should be clarified that said container consisting of the lower plastic foil and the upper plastic foil with the welded accessories is the inner bag referred to herein in the text. The welding of the upper plastic foil and the lower plastic foil is performed after the MF module has been joined to the upper plastic foil. The inner bag is completely airtight (with the exception of a small amount of air in the emptying channel) and hermetically sealed after welding the MF module to the upper plastic foil.

The device has features according to the features specified in claim 1. Features of a method of filling the packaging are specified in an independent method claim. A method of making an inner bag of a packaging is specified in an independent method claim. Further embodiments of the invention are presented in the dependent claims.

BRIEF DESCRIPTION OF EMBODIMENTS

Figure 1:
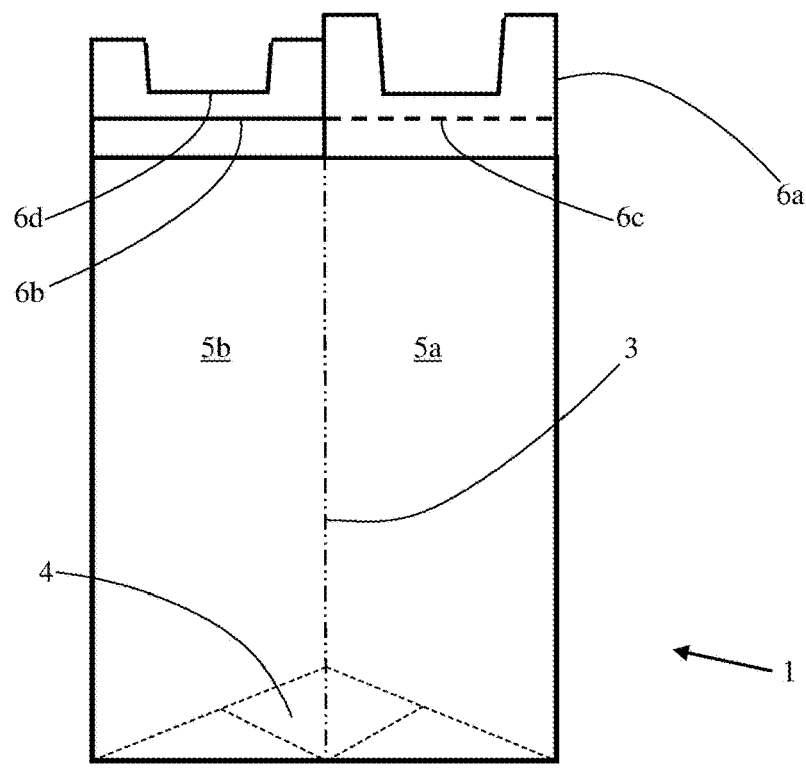
FIG. 1 schematically shows a plan view of a piece of cardboard which forms the basis for development into an outer casing for the packaging.
Figure 2:
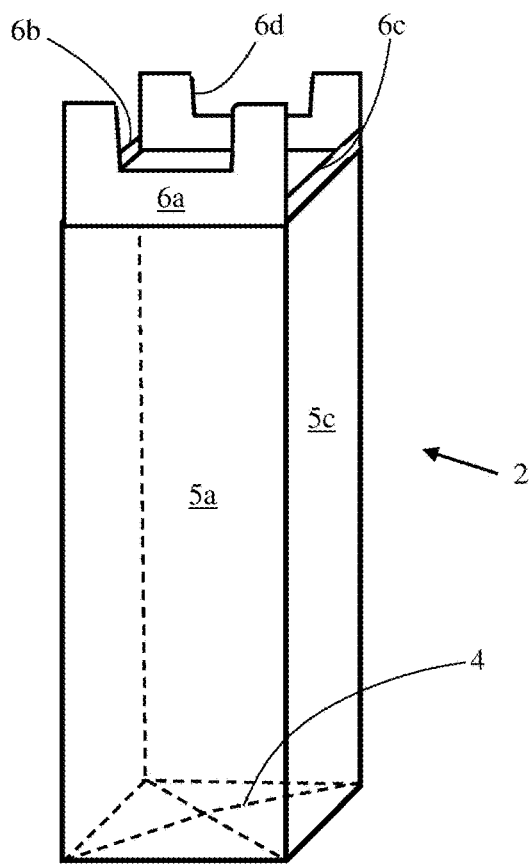
FIG. 2 illustrates the outer casing in a perspective view when it has been developed and formed from the cardboard piece according to FIG. 1.

In the following, a number of embodiments of the invention are described with reference to the accompanying drawings. The drawings show only schematically the principle of the device and do not claim to show to any scale any proportions between different elements thereof. As mentioned, the invention constitutes a packaging in which in FIG. 1 a becoming outer casing thereof is shown from a starting position in the form of a piece of cardboard 1 folded and glued along a long side to be further developed into an outer casing 2 according to FIG. 2, where the outer casing 2 in this figure is prepared for receiving a content after folds of the cardboard at folding indication 3 according to FIG. 1. Folded into the cardboard piece 1 is also shown a number of bottom flaps 4 which when developing the cardboard piece 1 form the bottom of the outer casing 2. When outer casing 2 is emptied these bottom flaps 4 can be folded in into the cardboard piece 1 so that the outer casing 2 can regain flat shape after it is flattened at folding indications 3 at the same time. This possibility of being able to achieve a flat shape of the outer casing 2 when emptying contents therefrom is of great importance for it to be possible to completely empty the packaging on its content of a liquid food. When the cardboard piece 1 unfolds, a square cross section of the outer casing 2 is formed. This is a preferred embodiment. Of course, rectangular cross-section is also a variant.

In the upper part of the side surfaces 5a, 5b, 5c, 5d, top flaps 6 are formed with a top flap 6a, 6b, 6c, 6d in contact with each of the side surfaces, the top flaps extending upwards from the respective side surface. The top flaps 6a and 6d constitute attachments for the so-called MF module to be attached to the top flaps, which is described below.

The inner bag 8 is made of two plastic foils which are welded together around the entire edge of each one of the plastic foils so that a soft container is formed. The welding is accomplished when an upper plastic foil 9 is laid over a lower plastic foil 10 (see FIGS. 5, 6, 7) whereupon the welding is implemented. Before the welding is arranged and before the two plastic foils 9, 10 are laid on top of each other, a hole 11 is punched out in the upper plastic foil 9 in the area which is to take place as the upper part of the inner bag 8. This hole 11 is later, when welding the MF module 12 to the upper plastic foil 9, coordinated to the position of the emptying channel 13 thereof. Upper plastic foil 9 and lower plastic foil 10 are punched or cut during manufacturing from rolled-out plastic foil.

Figure 4:
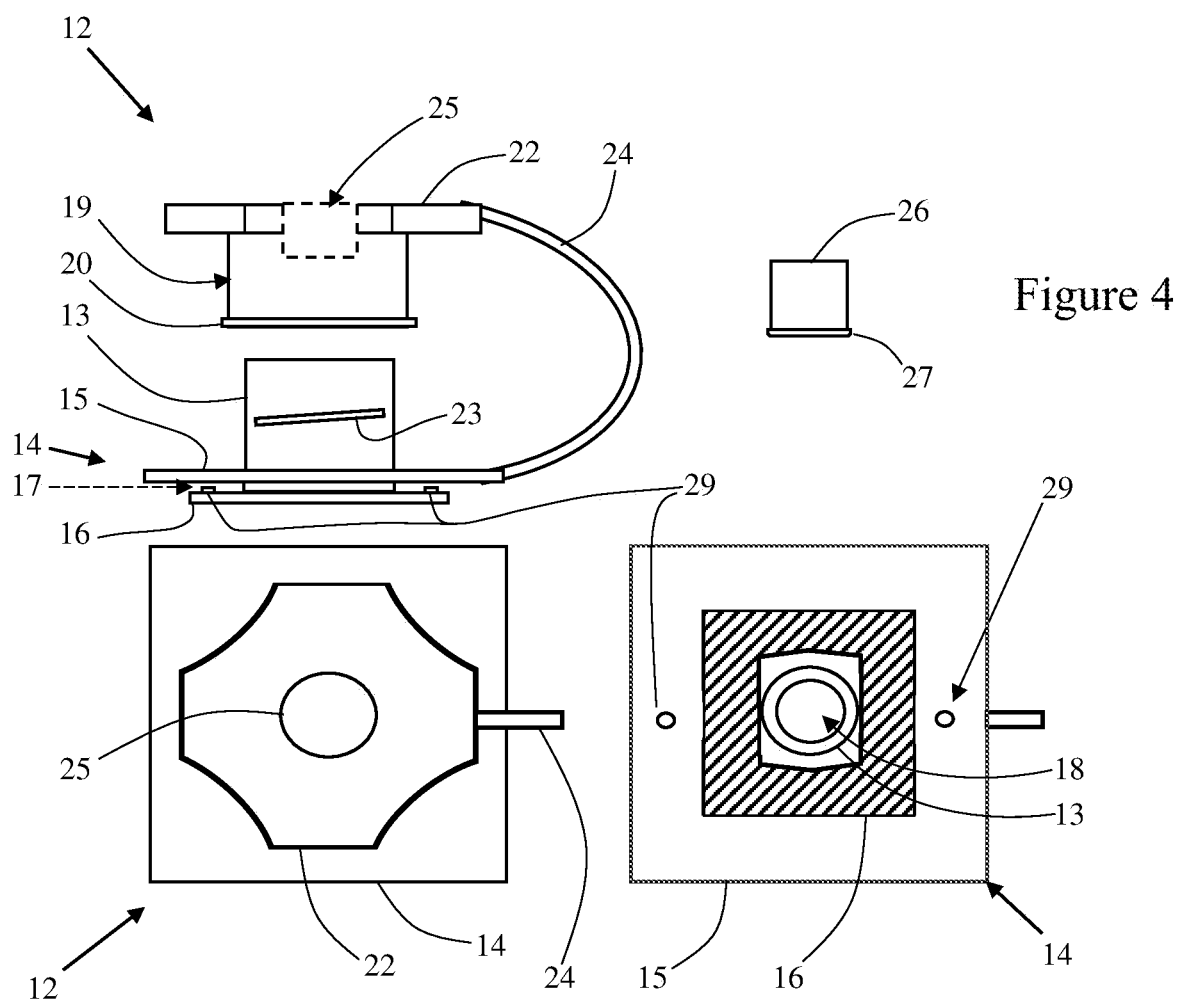
FIG. 4 shows the Multifunctional module (MF module) with its details shown from the side and from above and from below.

FIG. 4 shows the structure of the MF module 12. To the left in the lower part of the figure is a plan view from above of the MF module while the upper part of the figure shows a side view of the MF module 12 details with its elements. The MF module is built on a plastic disc 14. The plastic disc 14 consists of an upper 15 layer and a lower 16 layer. The lower layer 16 has a smaller area than the upper layer 15. A slot 17 is arranged between the upper and the lower layer. The dashed area in the plastic disc 14 according to FIG. 4 indicates the inner depth of a slot 17 running around the side edges of the plastic disc 14, as shown in FIG. 4 to the right in the lower part of the figure with a plan view of the MF module 12 seen from its underside. To this slot 17 connect the top flaps 6a and 6d, i.e. front and rear top flaps, of the outer casing 2 when the MF module 12 is coupled into these top flaps after the filling of the inner bag 8 and the seal of the outer casing around the MF module. The slot 17 has a slightly decreasing extension in height seen from an outer edge of the plastic disc towards the center thereof to provide better locking force against the top flaps 6a and 6d of the outer casing. Further, the MF module 12 has in the plastic disc 14 an opening 18 in which the emptying channel 13 is fixedly arranged in that the sleeve which forms the emptying channel 13 is concentric and fixedly connected to the opening 18 in the plastic disc.

FIG. 4 shows above the emptying channel 13 a stopper 19 which is sealing against the opening of the emptying channel 13 when the stopper is connected to it. The stopper 19 is equipped with the elements previously described, such as a breaking contact to the emptying channel 13 by means of a string 21 of, for example, plastic connected to the MF module 12 before the stopper is separated from the emptying channel. Since the stopper 19 is detached from the emptying channel 13 via a connection with a breaking function, a consumer can easily see if the packaging has been opened before. The stopper 19 has in its upper part a hood 22 which seals the upper wall of the stopper towards the surroundings. Furthermore, the inner part of the stopper is provided with an inner thread (not shown) which cooperates with an outer thread 23 around the sleeve which constitutes the emptying channel 13 when closing the emptying channel 13 by means of the stopper 19. The stopper 19 is connected to the plastic disc 14 by a wire loop 24 whereby the stopper 19 goes along with the MF module 12 at waste disposal according to EUs SUP directive.

In the hood 22 a filling channel 25 is arranged. This filling channel is intended to be used when filling the inner bag 8 with a liquid. The filling channel 25 extends through the hood 22 of the stopper 19 and thus opens into the emptying channel. This is a considerable advantage of the invention in that filling and emptying of the packaging takes place via a channel common to both activities. The filling channel 25 is sealed by means of a plug 26. The plug 26 is at its the bottom provided with a locking edge 27. Before filling the inner bag 8, the plug 26 is arranged with a light locking inside the filling channel 25 so that the plug can be raised and open the filling channel during the filling activity. After filling the inner bag is completed, the plug 26 is pushed down so that the locking edge 27 engages in the lower edge of the hood 22 and thus creates a completely proof stopper 19, where the filling channel can no longer be opened.

The plastic disc 14, the emptying channel 13 and the stopper 19 with the filling channel 25 together form a fully integrated and individual unit. The MF module 12 is made of a completely recyclable plastic, preferably of the same plastic material as the inner bag 8, whereby the entire packaging together with the MF module can be recycled as a co-sorted material.

Figure 5:
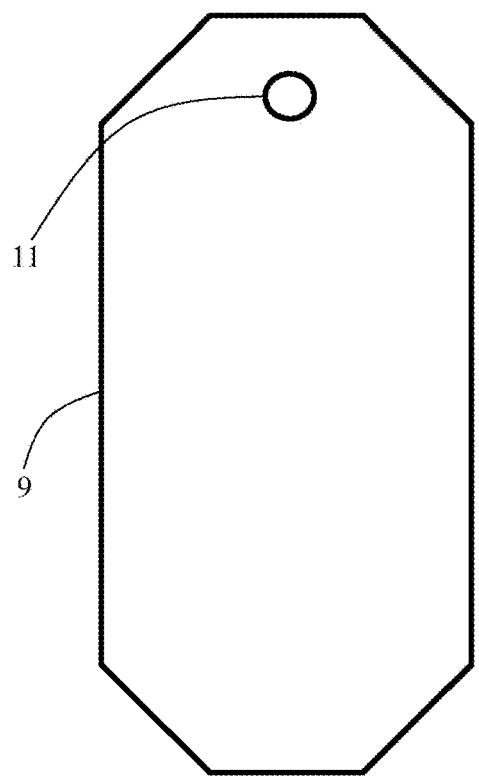
FIG. 5 shows the upper plastic foil with punched hole for MF module.
Figure 6:
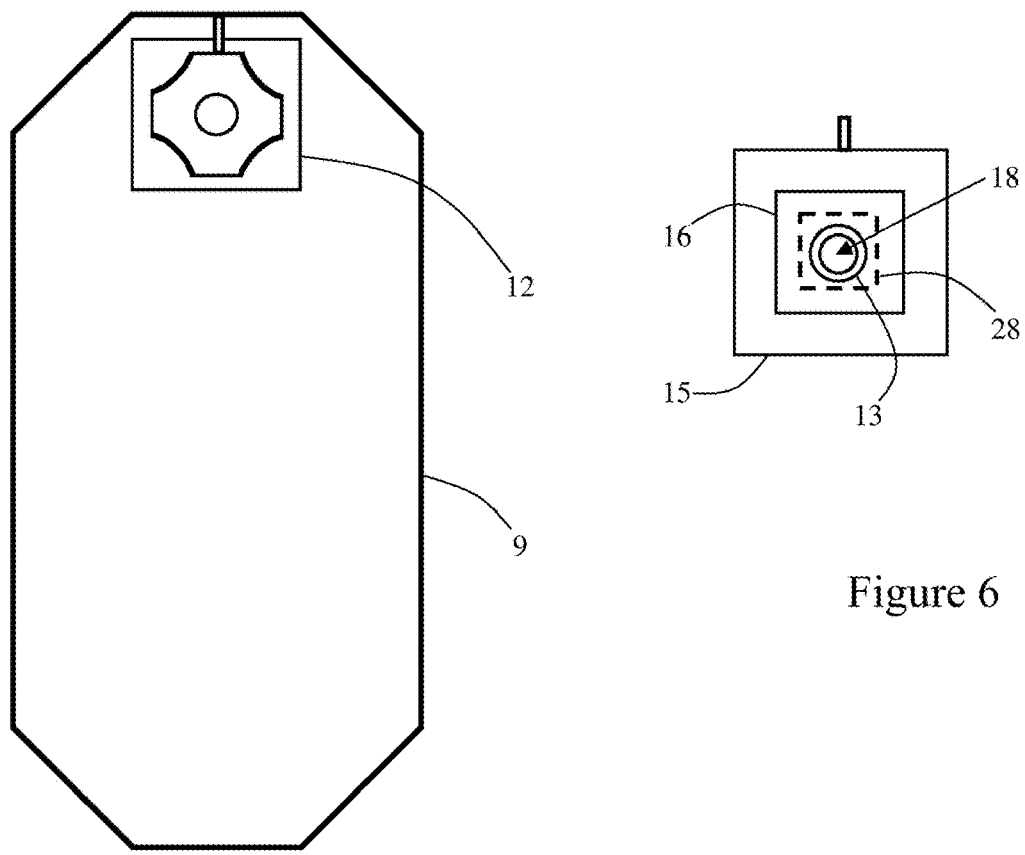
FIG. 6 shows the upper plastic foil with the MF module welded on. A section shows the position of welding strings when the MF module is welded to the upper plastic foil.

The upper plastic foil 9 is shown in FIG. 5, where it appears that a hole 11 is arranged in the upper part of the plastic foil, i.e. the part of the plastic foil that will be found at the top of the outer casing of the packaging. The hole 11 is punched, for example, in the plastic foil, but this can be done in another way. FIG. 6 shows how the MF module 12 is welded to the upper plastic foil 9, which will then form one half of the inner bag 8. The filling channel 25 in the stopper 19 of the MF module is arranged centered over the hole 11 in the upper plastic foil 9. The right part of FIG. 6 illustrates the plastic disc 14 in the MF module 12 seen in plan view from below. Here, the continuous welding strings 28 which are accomplished between the underside of the plastic disc 14 of the MF module 12 and the outside of the inner bag 8. The welding strings 28 are made around the opening 18 of the plastic disc 14 and are indicated by a roughly dashed curve around the opening 18.

Figure 7A:
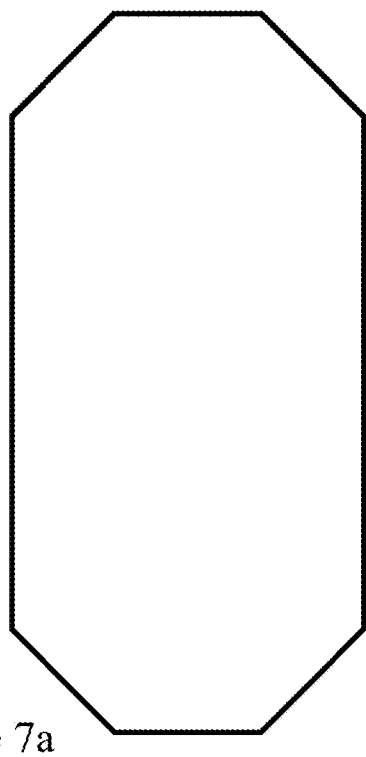
FIG. 7a depicts the lower plastic foil which is completely without openings or associated elements.
Figure 7B:
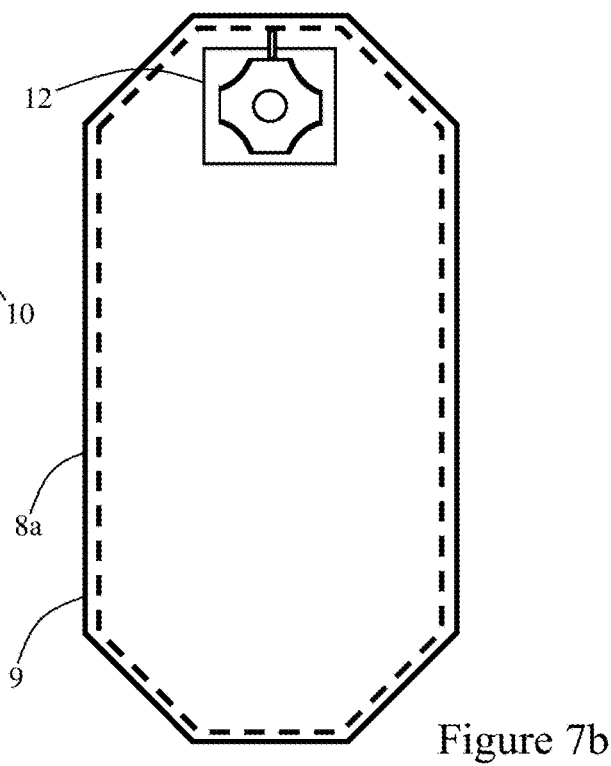
FIG. 7b shows the position of welding strings when upper and lower plastic foil are welded together into an inner bag.

The MF module 12 is designed so that no product from the inner bag 8, when filled, can leak from the edges of the MF module. The manufacture of inner bag 8 and welded MF module 12 takes place under conditions approved for food packagings. The inside of the inner bag 8 and the MF module are sterilized after joining by means of gamma radiation. It should be clarified that said container consisting of the lower plastic foil 9 and the upper plastic foil 10 with the welded accessories is the inner bag 8 referred to here in the text. The welding of the upper plastic foil 9 and the lower plastic foil 10 shown in FIG. 7*a* is executed after the MF module 12 is joined to the upper plastic foil 9. The inner bag 8 formed during the welding is shown in FIG. 7*b*, where the dashed line shows the position of the welded joint 8*a* between the two plastic foils 9, 10. After welding, the inner bag 8 is completely airless (with the exception of a small amount of air in the emptying channel) and hermetically sealed. Here it can be mentioned that the inner bag 8 as an alternatively can be manufactured from hose, whereby longitudinal edges of the inner bag do not have to be welded. Furthermore, FIG. 4 shows a number of studs 29 on the underside of the plastic disc 14 arranged below the upper layer 15 in an alternative embodiment of the invention. These studs 29 are then intended to engage in corresponding holes in the upper parts of the top flaps 6*a* and 6*d* where these are inserted into the slot 17 in the MF module 12 to further secure the connection between the MF module and the outer casing 2.

Figure 3:
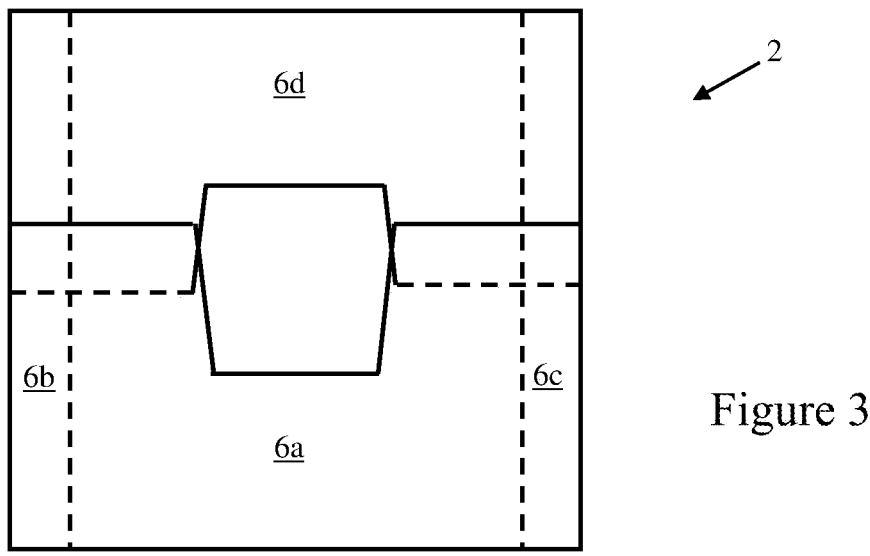
FIG. 3 shows the upper plane of the outer casing where top flaps of the outer casing are folded in and formed to a flat surface and showing the open part of the outer casing to be covered by a multifunctional module.
Figure 8:
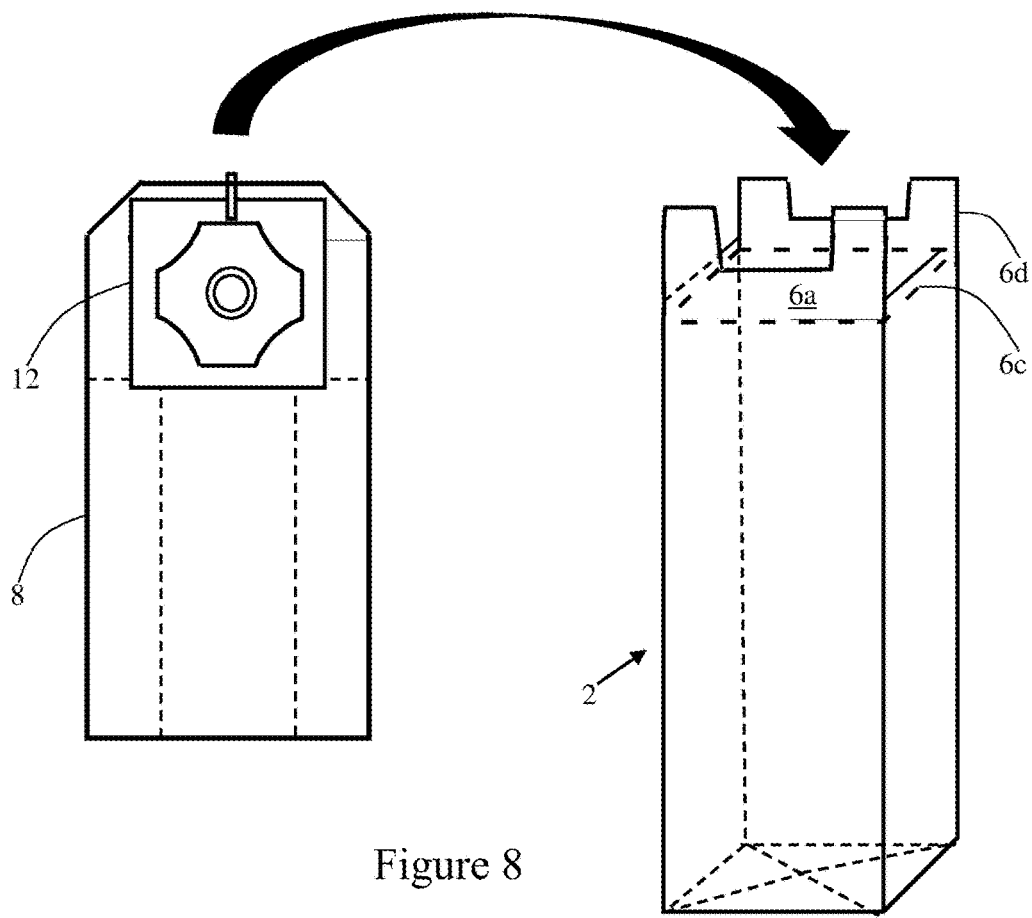
FIG. 8 indicates a format for a folded inner bag before it is lowered into the outer casing according to the sketch in the figure.
Figure 9:
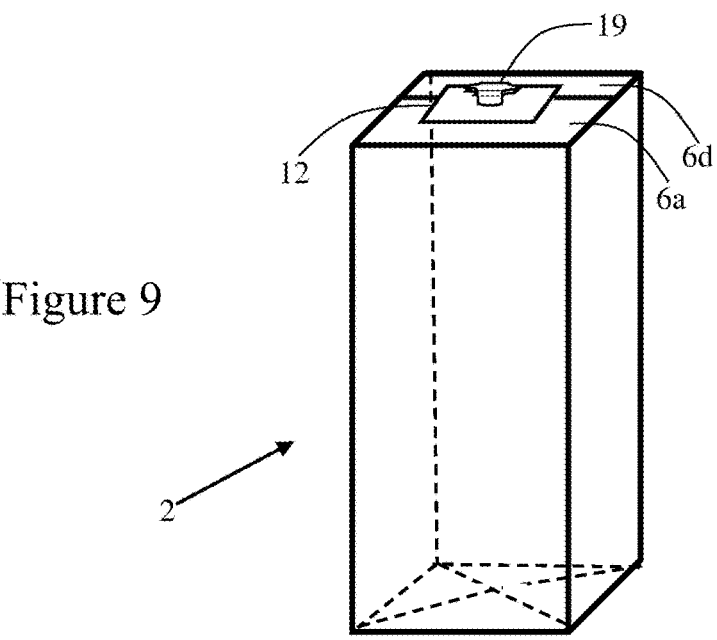
FIG. 9 illustrates filled packaging with the MF module on top.
Figure 10:
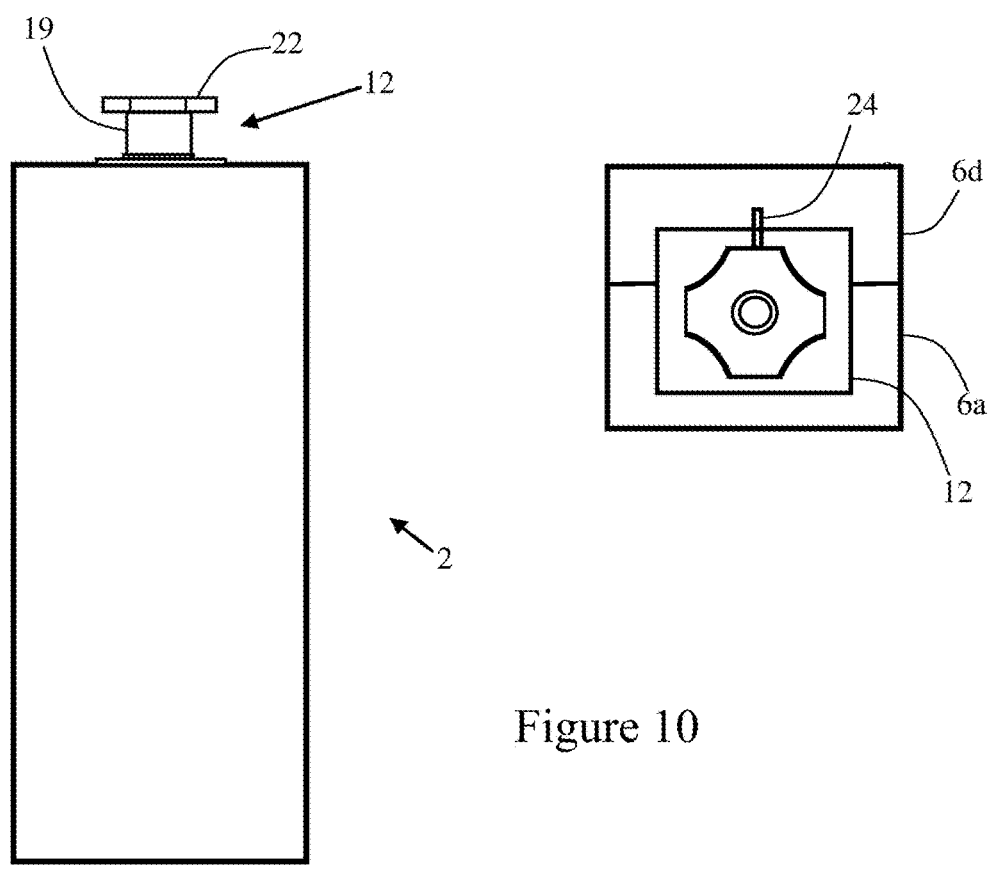
FIG. 10 shows a side view of the packaging with the closed upper plane and further a plan view from above of the closed top, i.e. of its upper plane.

The filling process is described below. The inner bag 8 has been folded together into a format according to the left part of FIG. 8 where the inner bag can in a preferred manner fill out the entire space inside the outer casing 2 when liquid is supplied to the inner bag 8. The figure shows how the folded inner bag 8 is lowered into the outer casing 2. Alternatively, the inner bag can be placed inside the outer casing even before the filling process. The MF module 12 attached to the inner bag 8 is held in a fixed position by a mechanical holder, i.e. an external tool. After filling the inner bag, the outer casing 2 is moved up towards the MF module. Synchronously with this process, the top flaps 6*a*-6*d* are folded inwards towards each other and meet the underside of the upper layer 15 of the plastic disc 14, whereby the top front flap 6*a* and the rear top flap 6*d* are forced into the slot 17 of the MF module 12. In this course of events it is arranged that the top flaps 6*b* and 6*c* on the sides are folded in first, then the rear top flap 6*d* is folded down over them. The front top flap 6*a* which is slightly higher than the rear top flap 6*d* is provided with a fastening strip which is glued over the edge of the rear top flap 6*d* which will be covered by the front top flap 6*a*. This can be clearly read from FIG. 3. This course of events takes place at the same time as the top flaps are brought together and into the slot 17. The front top flap 6*a* can be fastened with its outermost edge with a pair of glue points against an upper part of the rear top flap 6*d* to increase the stability of the outer casing 2. Alternatively, an adhesive strip may be placed over the joint between the front top flap 6*a* and the rear top flap 6*d*. This adhesive strip can then be provided with text, such as best before date.

Figure 11:
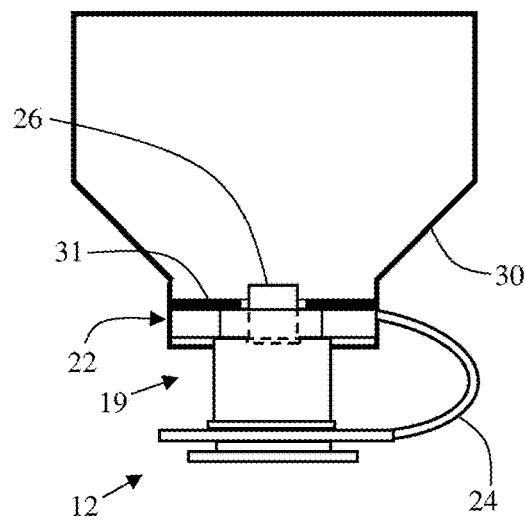
FIG. 11 shows a filling funnel connected to the filling channel when filling the packaging.

In a preferred process for filling the inner bag, a filling funnel 30 is abutted with its spout against the hood 22 on the cap of FIG. 11. The filling funnel 30 then has a proof connection to the top surface of the hood 22 around and outside the plug 26 by means of an in the spout transverse annular gasket 31 which with its underside is pressed against the hood with high pressure. In this first step, the plug 26 is locked in its initial position. The purpose of the filling funnel 30 is to protect the cardboard material in the outer casing 2 against hot water vapor during disinfecting the elements which are in contact with liquid which is filled into the inner bag.

Figure 12:
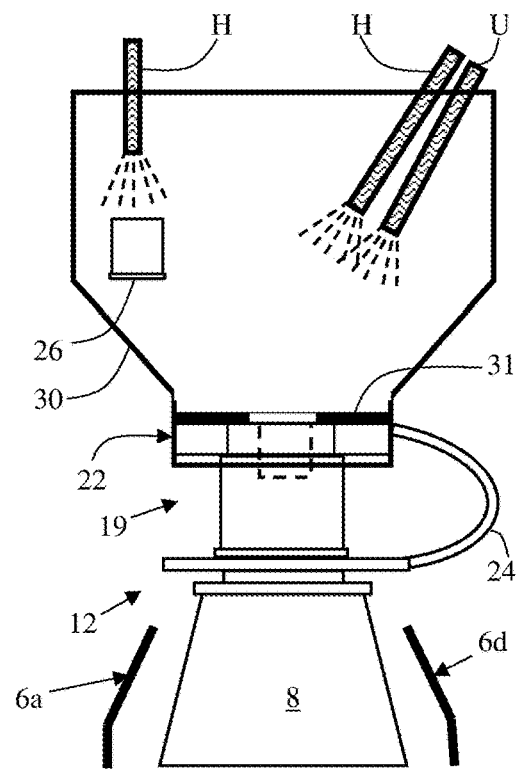
FIG. 12 illustrates a filling device during disinfection.

A step 2 during filling is shown in FIG. 12, where the plug 26 is detached from the hood 22 and held fixed in a lateral position in the filling funnel 30. Here is also shown how the MF module 12 is kept fixed a few centimeters above the raised and slightly folded top flaps 6*a* and 6*d* of the outer casing. The inner bag 8 is not filled in this step. The filling channel 25 is disinfected with hot water vapor or hydrogen peroxide spray. At the same time, the filling funnel and filling channel are illuminated with UV light. The disinfection begins before the filling plug 26 is lifted out of the stopper 19 and then continues throughout the filling process until the filling plug 26 is resealed after the completion of the filling procedure.

Figure 13:
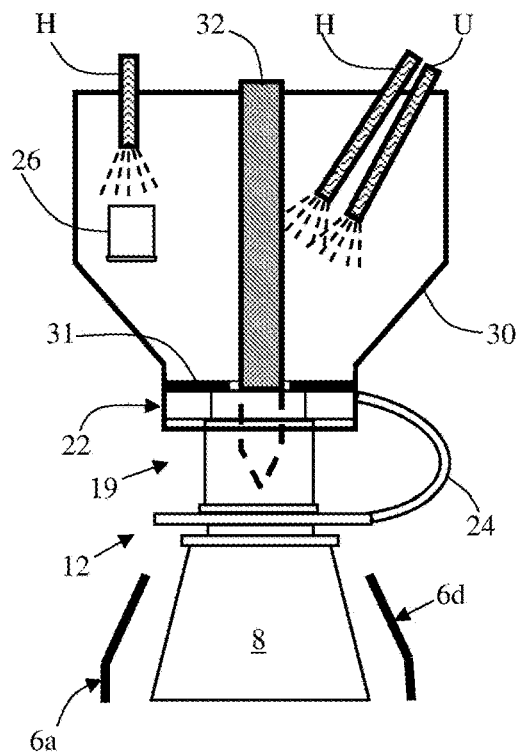
FIG. 13 depicts the device according to FIG. 12 where a filling nozzle is inserted in the filling channel.
Figure 14:
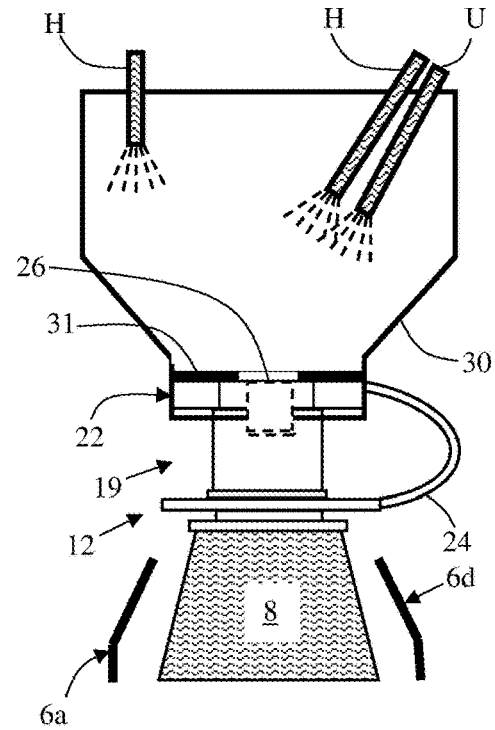
FIG. 14 shows the device according to FIG. 12 after completion of filling and resealing of the filling channel.

FIG. 13 shows step 3 of the filling where a filling nozzle 32 is lowered into the filling channel 25. The filling nozzle 32 seals completely against the insides of the filling channel 25. Filling can now take place with high pressure because the inner bag 8 is airless and as a result no air needs to be forced out during the filling process. After the filling of the inner bag 8 is completed, the filling channel 25 is sealed by means of the filling plug 26 which is inserted into a locked position. This is shown in FIG. 14 where the filling funnel 30 is ready to be lifted off.

Figure 15:
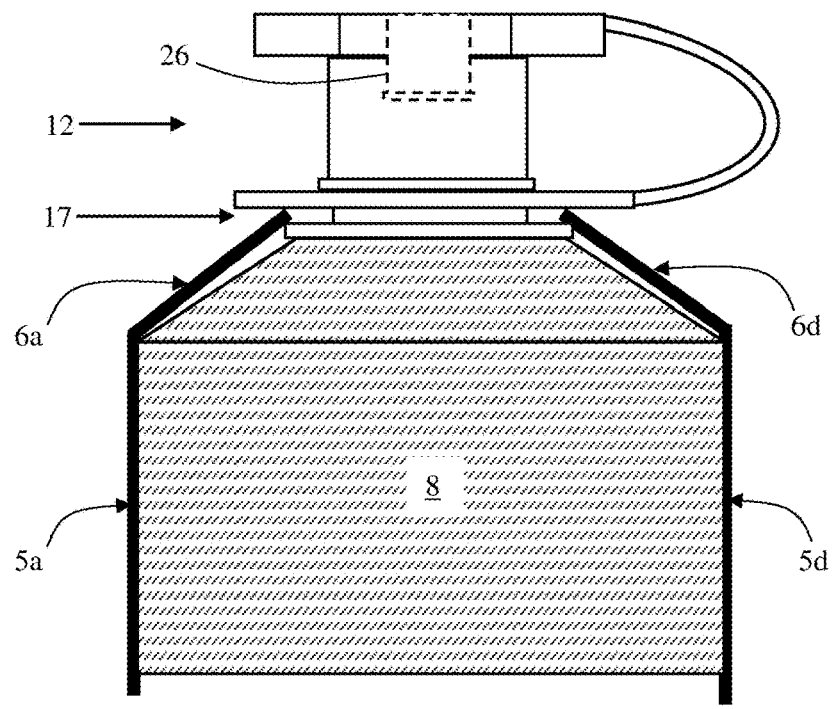
FIG. 15 illustrates the device after the inner bag has been filled, the filling funnel has been removed and where the top flaps of the outer casing begin to be inserted towards being locked into the slot of the MF module.
Figure 16:
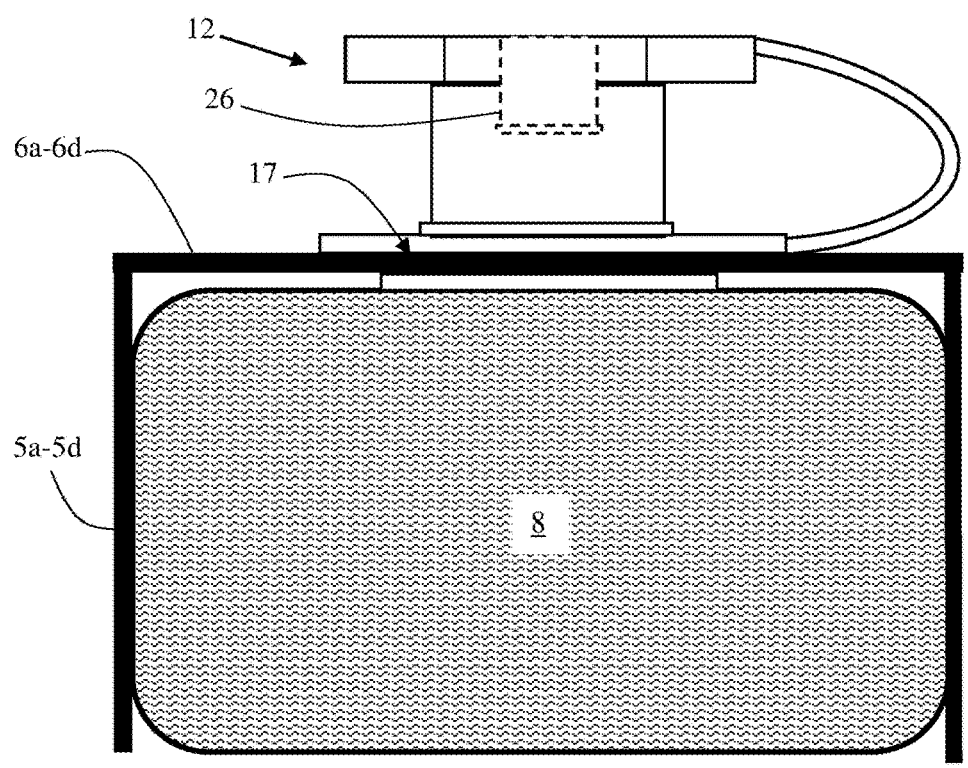
FIG. 16 shows a section of a filled packaging with a filled inner bag and a closed emptying channel and closed filling channel, respectively.

FIG. 15 shows that the filling funnel is lifted off and that the outer casing 2 is moved upwards towards the MF module 12 so that the top flaps 6*a* and 6*d* meet the underside of the upper layer 15 of the plastic disc 14 and are thereby forced inwards into the slot 17 and become fixed in the MF module by the slot. When the outer cover 2 is raised completely towards the MF module 12, as shown in FIG. 16, the top flaps 6*a*-6*d* disclose a flat upper side of the packaging where now the inner bag 8 is completely filled. The locked sealed filling channel is shown with the plug 26 pushed down completely in the hood 22 of the stopper 19. As mentioned earlier, in an alternative embodiment, the top flaps can be fixed, in the slot 17, to studs which engage in small holes of the top flaps in positions corresponding to the positions of studs in slot 17 of the MF module 12.

Equipment for disinfection by means of hydrogen peroxide or hot water vapor/hot air, which is marked in the figures with H, and equipment for disinfection with U. Because disinfection can take place to a small extent, there is an extensive saving of hydrogen peroxide compared to disinfection of the entire interior of the packagings with hydrogen peroxide as is the case in current technology, for example when filling packagings not provided with inner bags.

Since the inner bag 8 is airless during filling, only a very small volume of air remains in the emptying channel 13 itself in the MF module 12 after filling. This prevents unwanted oxidation of the contents of the inner bag, ie. of the liquid food, and thus significantly prolongs the shelf life of the contents compared to liquid foods filled in conventional packagings. The air content of a 1-liter packaging prepared and filled according to the inventive aspect constitutes less than 0.3% percent of the packaging volume. In liquid food packaging according to the prior art, the content of air can be up to 7% of the corresponding volume. This property is of significant importance in food technology, as the shelf life during transport and storage of liquid food can be extended considerably compared to what is possible when using today's corresponding packagings.

Air between the inner bag 8 and the outer casing 2 flows out when filling, partly via the top, and partly via the bottom of the outer casing 2 which also has openings in the foldable bottom construction between some of the bottom flaps formed during folding around the folding indications 4. After filling the inner bag 8 the top flaps 2 of the outer casing 2 are inserted into the slot 17 of the MF module by lifting the outer casing 2 upwards and forcing the top flaps into the slot.

The fold-in construction with the bottom flaps 4 in the bottom of the outer casing 2 gives a consumer the opportunity to easily squeeze out viscous foods (such as yoghurt, crème fraiche etc.). The lower parts of the outer cover 2 of the side surfaces can be compressed in order to thereby apply pressure to the inner bag 8 and contribute to empty the packaging. When the inner bag has been removed from the packaging, the outer casing can be easily flattened by the user by means of pressing the bottom flaps into the outer casing and at the same time pressing on the sides of the outer casing. As a result, the outer casing 2 is easily returned to a flat piece of cardboard 1 similar to the original condition according to FIG. 1, after which it is sorted as waste material.

The outer casing 2 is easily opened on the upper side by peeling off the two tongues of the front top flap 6a which extend towards the rear top flap 6b on each side of the MF module. As a result, the consumer can pick out the inner bag 8 and possibly empty it further if desired by squeezing out, folding or rolling the inner bag.

If an additional barrier effect against the influence of oxygen and/or other gases as well as UV light on the content of food is desired, the inner bag 8 can be made of a plastic material other than PE plastic and/or of laminate. By laminate is meant here that the material can consist of several layers of plastic, e.g. 3 foils of plastic, and/or aluminum and other coatings. The weight of a 1-liter packaging according to the invention is equivalent to the corresponding packagings for liquids currently on the market (about 30 grams per piece). The height of a 1-liter packaging is about 10% (about 2 cm) lower compared to a packaging of type TetraRex®, which provides the opportunity to increase the number of packagings that can be loaded on a loading platform or a container.

The invention claimed is:

1. Packaging for liquid foods, comprising:
   an outer casing of cardboard,
   an inner bag of plastic foil consisting of completely recyclable bio-polyethylene plastic, the inner bag being arranged inside the outer casing and completely filling the outer casing when the inner bag is filled with said liquid food,
   an opening module, here called MF module, which contains an emptying device and a filling device arranged on a plastic disc, wherein the emptying device comprises an emptying channel and a stopper, and wherein the filling device comprises a filling channel and a plug, whereby the filling channel is arranged in the stopper of the emptying channel, furthermore the MF module is connected to the inner bag as the underside of the plastic disc is welded to the outer side of the inner bag in such a way that the emptying channel is connected to a hole in the inner bag, and
   the MF module is connected to the outer casing as top flaps of the outer casing are attached to a circumferential slot along the edges of the plastic disc of the MF module.

2. Packaging according to claim 1, wherein the outer casing consists of recyclable cardboard with a content of about 90% paper fibers.

3. Packaging according to claim 2, wherein the inner bag is made of an upper and a lower plastic foil laid against each other and welded together along the edges of the plastic foils by means of a welding joint.

4. Packaging according to claim 3, wherein the outer casing has an elongate parallelepipedic body wherein one of the surfaces defining the elongate body constitutes the bottom of the outer casing while the other delimiting surface of the elongate body constitutes an upper plane of the outer casing.

5. Packaging according to claim 4, wherein the top of the outer casing consists of the top flaps which are all folded inwards towards the side edges of the plastic disc in the MF module, so that the top of the outer casing is flat.

6. Packaging according to claim 5, wherein the stopper of the MF module is attachable to the emptying channel by means of a thread or a bayonet socket, wherein the emptying channel is arranged in communication with an opening through the plastic disc having the slot between an upper layer and a lower layer of the plastic disc in the outer edges thereof.

7. Packaging according to claim 6, wherein the stopper in the emptying device has a hood through which the filling channel extends down towards the emptying channel and wherein the filling channel is sealed with the plug which is locked with a locking edge when the packaging is filled.

8. Method for producing the inner bag according to claim 3, comprising:
   the upper plastic foil and the lower plastic foil are punched or cut out of plastic foil,
   the hole is punched or cut out in the upper plastic foil,
   the MF module with the emptying channel is welded to the upper plastic foil, the emptying channel being arranged against the hole, and
   the upper plastic foil is welded together with the lower plastic foil along the edges of these two foils by means of the welding joint.

9. Method for filling the packaging according to claim 1, comprising:
   a filling funnel is brought with its spout against a hood on the stopper,
   the plug is detached from the filling channel and kept separate from it inside the filling funnel,
   a filling nozzle is inserted into the filling channel of the MF module,
   liquid food is introduced into the inner bag under pressure until the inner bag fills the entire space of the outer casing,
   after the filling of the inner bag is completed, the filling channel is sealed by means of the plug, and
   the plug is locked securely and sealingly to the inside of the filling channel by means of a locking edge on the plug.

10. The method according to claim 9, further comprising the steps of:
    the filling channel is disinfected with hot water vapor or hydrogen peroxide spray, and
    filling channel and filling funnel are illuminated with UV light, and
    disinfection and illumination are started before the filling plug is lifted off and continue until the filling plug is resealed towards the filling channel.

11. The method according to claim 10, comprising the step of:
    the inside of the inner bag and the MF module are sterilized by gamma radiation.

12. The method according to claim 9, further comprising the steps of:
    during the filling process, the MF module is held fixed by a tool, after filling liquid to the inner bag, the outer casing is moved up towards the MF module, whereby the top flaps of the outer casing meet the underside of the upper layer of the plastic disc and being forced inwards into the slot and thereby become fixed in the MF module so that the outer casing and MF module form the final packaging.

13. The method according to claim 9, comprising the step of:

filling the liquid food into the inner bag until less than about 0.3% of the volume of the packaging is air.

* * * * *